April 16, 1935.　　O. F. CARLSON　　1,997,785
BOILER FEED CONTROL
Filed July 11, 1932　　5 Sheets-Sheet 1

Fig. 1

Inventor:
Oscar F. Carlson
By [signature]
Att'ys

April 16, 1935.  O. F. CARLSON  1,997,785
BOILER FEED CONTROL
Filed July 11, 1932   5 Sheets-Sheet 4

Inventor:
Oscar F. Carlson

April 16, 1935.     O. F. CARLSON     1,997,785
BOILER FEED CONTROL
Filed July 11, 1932     5 Sheets—Sheet 5

Inventor:
Oscar F. Carlson

Patented Apr. 16, 1935

1,997,785

UNITED STATES PATENT OFFICE 1,997,785

BOILER FEED CONTROL

Oscar F. Carlson, Chicago, Ill.

Application July 11, 1932, Serial No. 621,859

14 Claims. (Cl. 137—101)

The present invention relates generally to boiler feed water controllers or regulators particularly adapted for automatically supplying water or other liquids to boilers or the like to maintain a substantially constant liquid level therein. More particularly, the present invention contemplates the provision of an improved feed water regulator for maintaining a constant water level in a steam boiler, such as those used in low pressure steam heaters and the like.

Generally speaking, devices of this kind usually comprise a valve interposed in the feed water conduit leading from a source of supply to the boiler and a float or other liquid level responsive means operatively connected with the valve and mounted in a float housing or the like which is in communication with the boiler in such a manner that the level of the water in the boiler and the level in the float housing are the same. As will be apparent, in such devices when the level of liquid in the boiler falls to a predetermined point the float is lowered which thereupon opens the feed water valve to allow a supply of make-up water to be added to the water in the boiler. In this manner the water level in the boiler is maintained at substantially a constant level therein.

One of the principal objects of the present invention is to provide a feed water regulator for boilers or the like which is capable of being quickly and inexpensively installed on boilers already in place. Briefly, in this connection, the present invention contemplates providing a feed water regulator which is adapted to be connected with the boiler by merely removing the gauge glass of the boiler and attaching the regulator at the same points where the gauge glass is adapted to be connected. Another object of the present invention is the provision of connections for the regulator housing permitting the latter to be installed in two or more optional positions, and another feature of the present invention is the provision of adjustable connections by virtue of which the water feeder or regulator may be installed on various boilers having different sizes or arrangements of gauge glasses, particularly for different spacings of the gauge glass tappings on the boiler. A further object of the present invention, in connection with the provision of a water feeder which can be installed at the usual gauge glass fittings of the boiler, is the provision of connections for installing the gauge glass on the water feeder or regulator itself after the gauge glass has been removed to permit the installation of the water feeder.

Another object of the present invention relates to the operating mechanism whereby the supply of feed water or make-up water is controlled. The present invention contemplates providing a float controlled mechanism in which the float is made responsive to the liquid level in the boiler and is so constructed and arranged that the float is disposed entirely above the lower connection to the boiler and entirely below the upper connection. This is an important feature in connection with water feeders which are adapted to be mounted where the gauge glass is usually disposed. Generally the distance between the gauge glass tappings is not great, and the conventional type of water feeder with which I am aware is not adapted to be mounted in this manner without necessitating the disposition of the float and float housing below the lower connection with the boiler. This condition is not conducive to the best operation because the lower portion of the float housing then becomes or acts as a pocket in which mud, slit, and other objectionable material collect and which may under some conditions cause the float to stick, thereby disarranging the entire regulator.

Another object of the present invention is the provision of a water feeder for boilers and the like which is capable of being connected close to the boiler so that long connections to the feeder are dispensed with. One disadvantage of such long connections is that by virtue of their exposure to room temperature there is a considerable difference between the temperature of the water in the float housing and the connections and the temperature of the water in the boiler. The greater this temperature difference, the greater is the error of the instrument, that is, if there is a considerable temperature difference the water level in the float housing will not be the same as the water level in the boiler. By the provision of a water feeder which can be attached directly in place of the gauge glass fittings irrespective of the spacing of such fittings such objectionable long connections are not required and a construction is obtained in which the water level in the float housing is for all practical purposes the same as the water level in the boiler and serves as a true index thereof. In this way correct, accurate, and positive regulation is attained.

Another object of the invention is to provide a small float of relatively small vertical height but of relatively large horizontal cross section so that the float will provide a relatively high flotation force for small changes of level and the disposition of this float in such position that it will cut off the inflow of water when the level in the boiler stands only a short distance above the bottom of the gauge glass, quite independently of the vertical height of the gauge glass. That is to say, I dispose the adjustment wholly at the top of the device and provide only a fixed connection from the float housing to the lower gauge glass fitting. As a consequence, no matter how high the upper gauge glass opening in the boiler is disposed above the lower gauge glass opening in the boiler, my feeder will close off the inflow of water as soon as the level in the boiler reaches a position a short fixed distance above the bottom of the gauge glass no matter what the length of the gauge glass. The practical advantage of this is highly important. The gauge glass openings in the boiler are always provided with fixed relation to two definite limits of the boiler. The water must not go substantially below the bottom of the gauge glass, i. e., below the opening provided for the lower gauge glass fitting, otherwise the top heating surfaces of the boiler will be uncovered and may be burned or cracked by failure of the water to cool the same.

On the other hand the water should not be allowed to rise above the top of the gauge glass i. e., above the top gauge glass opening in the boiler, otherwise the boiler will not steam properly and will tend to prime and discharge water into the steam mains. The result of such excessive water content is irregular and improper operation of the boiler, and a very sluggish action on starting up.

Now a practical difficulty in the operation of boilers of the class herein described and to which my feeder is particularly applicable is that when such boilers are employed for heating buildings and the like service, the steam required to heat up the building often exceeds the capacity of the boiler between the usual level at the middle of the gauge glass and the top of the gauge glass. The result is that during operation of the boiler particularly during initial warming up when maximum steam is delivered from the boiler and maximum condensate is in the radiators and return pipes, the water in the boiler drops below the normal level. Now if the feeder should admit water at this stage, and it will if set to close at the middle of the gauge glass, such admitted water will result in the following difficulty i. e., that when the demand for steam dies down, as at the end of the daily heating period, this make up water will, together with the return of the condensate drown the boiler, i. e., cause the level to rise above the upper gauge glass opening, and stand completely out of sight in the gauge glass. Then upon starting up again as in the morning of the next day's run the boiler will not operate properly, i. e., will be irregular and sluggish and will not steam properly. This difficulty has generally been recognized and in prior feeders the float has been arranged to open a waste valve to get rid of the excess water. This is highly undesirable from two standpoints. First it wastes water and heat and second it requires the introduction of a great deal of raw water which deposits its solids in the boiler and fittings.

All this difficulty is avoided in my feeder by arranging the float to operate to cut off at a fixed point close to the bottom of the gauge glass, first to avoid taking in unnecessary water, and second to allow the room so provided to receive the return of condensate when the demand for steam is decreased, i. e., when the boiler pressure is allowed to drop, as at night. Also this results in improved operation during the normal run in that the boiler steams more readily and freely.

By thus fixing the cut off of the float valve at a low level, i. e., a short fixed distance above the bottom gauge glass opening in the boiler and providing the expansible and retractible connection at the top only, my feeder may be applied to the gauge glass openings of any boiler regardless of the spacing of the gauge glass openings and the advantageous feature of not admitting excess water and not being required to waste an equal quantity of water is invariably attained.

A further object of the invention is the provision of a compact feeder which has improved operating connections between the float and the valve, and also has the thermally isolated valve disclosed in my copending application, Serial Number 513,485, filed February 5, 1931, now Patent No. 1,934,486 issued November 7, 1933.

Other objects of the present invention include the disposition of the strainer in the supply line at the lowest point in the connections between the control valve thereof and the source of supply, whereby the strainer can be easily and conveniently removed and replaced for cleaning, and the provision of means in the operating connections between the liquid level responsive float and the control valve to provide for the attachment of other instrumentalities, such as low level cutouts, low level alarms, pressure responsive devices and the like.

These and further objects are attained in the preferred construction described in detail below and illustrated in the accompanying drawings, in which.

Figure 1:
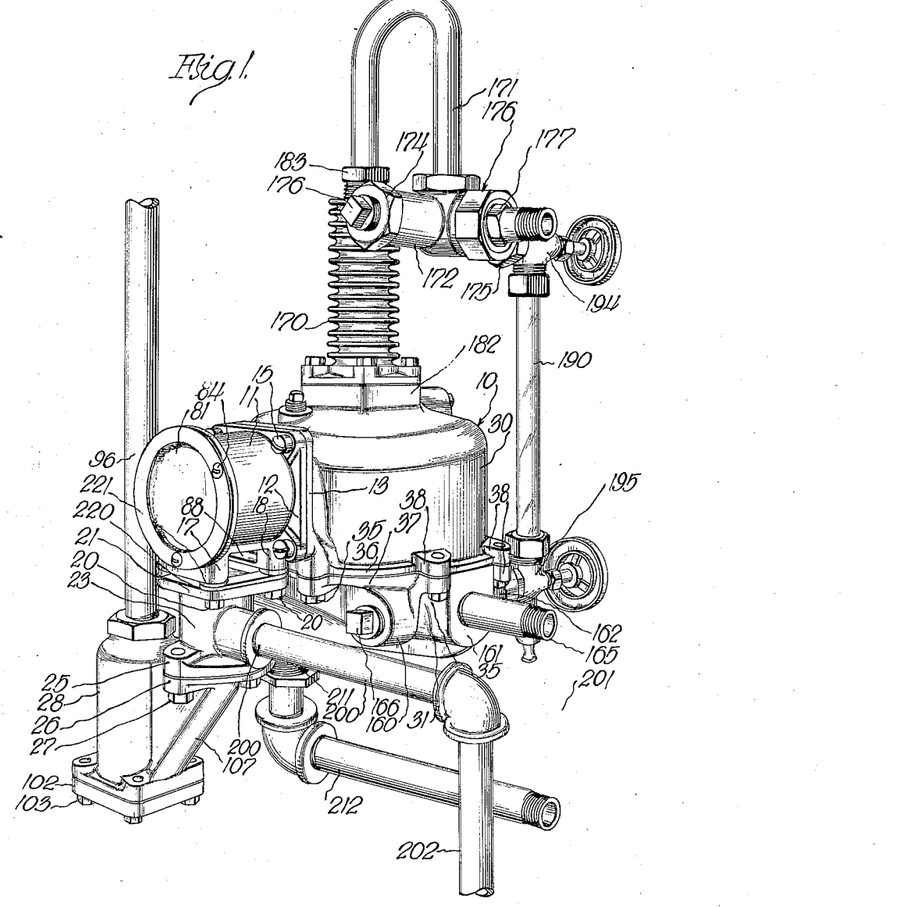
Figure 1 is a perspective view of the assembled water feeder as it appears from the boiler side with the adjustable fitting extended to accommodate a relatively tall gauge glass, i. e., relatively great spacing of the gauge glass openings of the boiler.
Figure 3:
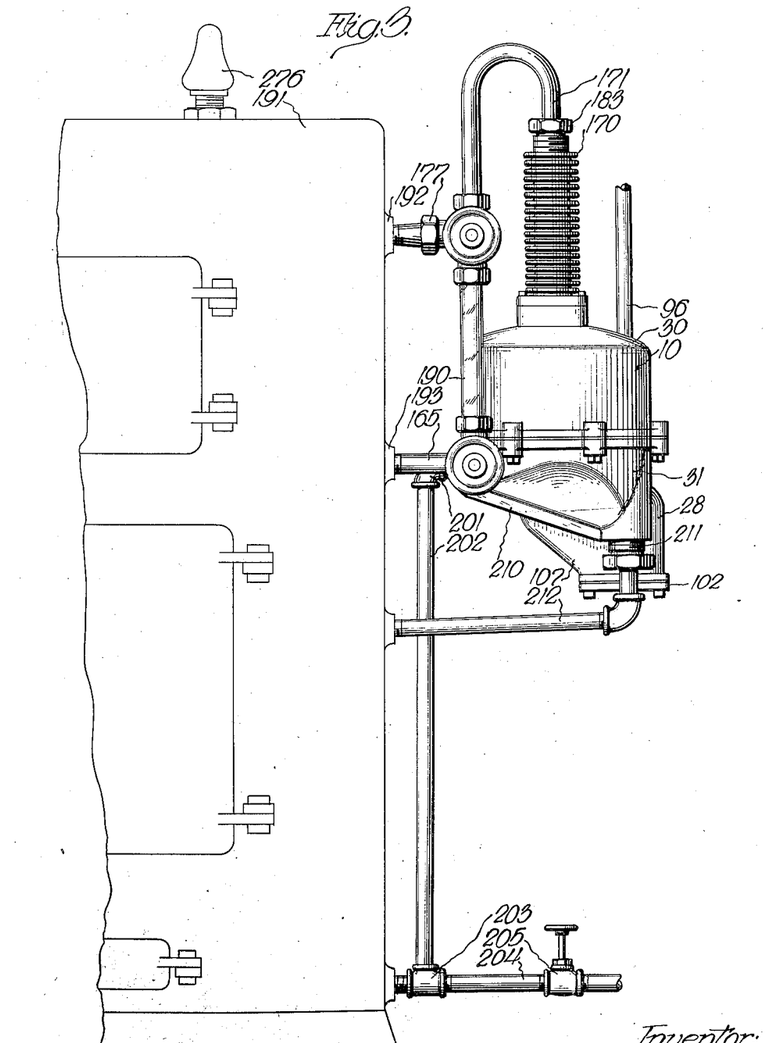
Figure 3 is a view showing the water feeder mounted on a boiler of conventional construction with the adjustable fitting and gauge glass substantially as shown in Fig. 2.

Referring now more particularly to Figures 1 and 3, the reference numeral 10 indicates in its entirety the housing adapted to be connected to a boiler and containing the liquid level responsive means such as a float or the like. A port is formed near one end of the float housing 10, and connected to this port is an intermediate housing 11, the latter including a flange 12 preferably integrally formed therewith and adapted to register with a corresponding flange 13 formed on the body of the float housing 10. These flanges have suitable openings registering with one another and are adapted to receive cap screws 15 or the like to secure the float housing and the intermediate housing together in proper assembled relation.

The intermediate housing is formed with a pair of spaced lugs 17 and 18 at its lower portion. These lugs have suitably threaded openings to receive cap screws 20 passing through the flange 21 of a valve housing, indicated in its entirety by the reference numeral 23, and serving to connect the valve housing with the intermediate housing 11. In this manner the valve housing 23 is supported in vertical position from the lower portion of the intermediate housing 11. The valve housing is provided with suitable oppositely extending lugs 25 with which a pair of cooperating lugs 26 formed on an inlet or strainer housing 28 are adapted to register. The lugs 25 and 26 are apertured and threaded to receive securing cap screws 27 by which the housing 28 is secured to the valve housing 23.

Figures 2, 7:
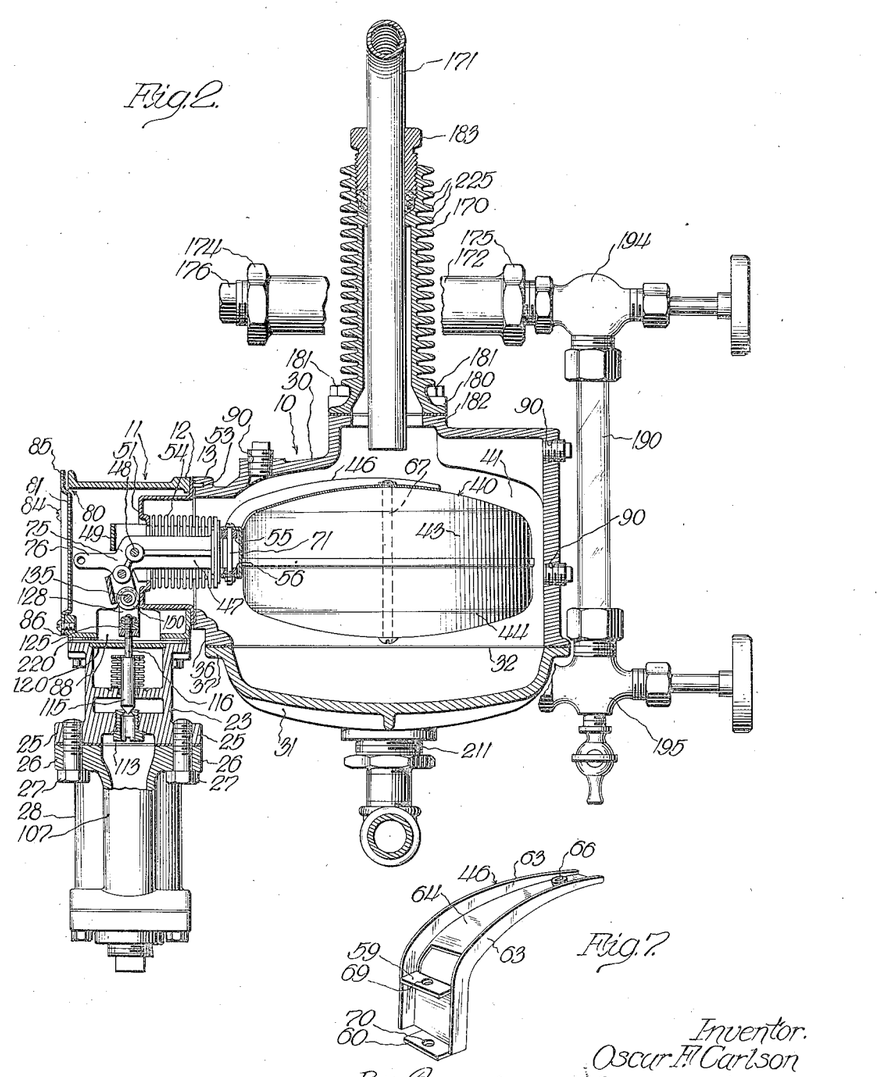
Figure 2 is a vertical sectional view taken substantially midway through the valve and float housings showing the adjustable fitting contracted to accommodate a relatively short gauge glass i. e., a relatively small spacing of the gauge glass openings in the boiler.
Figure 7 is a perspective view of the inner section of the float arm.

Referring now more particularly to Figure 2, it will be noted that the float housing 10 includes an upper housing part 30 and a lower housing part 31 suitably connected together by any suitable means and rendered leak-tight by a gasket 32. Preferably, however, the two housing parts 30 and 31 are connected together by means of a series of cap screws 35 (see Figure 1) arranged around the periphery of the housing parts and serving to connect the flange portions 36 and 37 thereof. These flange portions may be provided with suitable bosses 38 having apertures to receive the cap screws 35. It is to be noted that the cap screws 35 are arranged at uniform distances apart around the periphery of the housing parts. This is for the purpose, as will be later described in detail, of permitting the two housing parts to be connected together in various positions relative to each other. This would not be practical if the cap screws 35 and the bosses 38 were not uniformly spaced on the housing parts 30 and 31.

A float 40 is movably supported within the float chamber 41 formed by the float housing 10. The particular construction of the float will be described later in detail so that it will be sufficient to note here that the float comprises a pair of interconnected sections 43 and 44 suitably secured together, as by soldering or the like. The float is carried by the inner section 46 of a float arm which is indicated in its entirety by the reference numeral 47 and pivotally supported by means of a pivot pin 48 upon a bracket 49 secured to or forming a part of a cup-shaped partition plate 51. The partition plate is provided with a flange adapted to be secured between the float housing 10 and the intermediate housing 11, as best shown in Figure 2. A pin 53 is preferably secured to the flange and is received within a suitable opening in the flange 13 of the float housing 10, whereby the partition plate 51 which forms the pivotal support of the float arm 47 is secured in proper position when the housings 10 and 11 are assembled by inserting and tightening the cap screws 15. A flexible diaphragm or sealing bellows 54 is connected between the partition plate 51 and the float arm 47 in leak-tight relation and effectively prevents the escape of steam and water from the float housing into the interior of the intermediate housing 11 but without interfering with the relative movement between the float arm and its supporting plate 51.

The outer section of the float arm 47 is preferably in the form of a suitable casting or the like and is provided with horizontal and vertical webs for the purpose of strengthening the same. The inner end of the outer float arm section is provided with a pair of ears 55 and 56 to receive the cooperating ears 59 and 60 formed on the inner float section 46, as best shown in Figure 7. Preferably, the inner float arm section 46 is formed of sheet metal with suitable marginal flanges 63 and a connecting web portion 64. At its innermost end the section 46 is formed with a boss 66 drawn in the web and provided with interior threads to receive the threaded end of a long screw or bolt 67 which secures the float 40 to the inner section 46 of the float arm 47. The ears 59 and 60 are preferably formed, as indicated in Figure 7, by severing portions from the stock of which the section 46 is formed and bending the portions until they extend at substantially right angles to the plane of the web 64. The ears 59 and 60 are provided with apertures 69 and 70 to receive a bolt 71 by which the inner float arm section 46 is connected with ears 55 and 56 on the float arm casting 47. Preferably, and as shown in Figure 2, the inner float arm section 46 is curved to follow the contour of the float 40.

The outer end of the float arm 47 is turned downwardly at an angle to the longitudinal axis of the float arm, the portion of the float arm thus angled being indicated by the reference numeral 75 in Figure 2. Preferably the portion 75 makes an angle of about 60 degrees with the longitudinal axis of the float arm 47 and, when arranged as illustrated in Figure 2, about 30 degrees with the vertical.

Figures 4, 6, 8, 10:
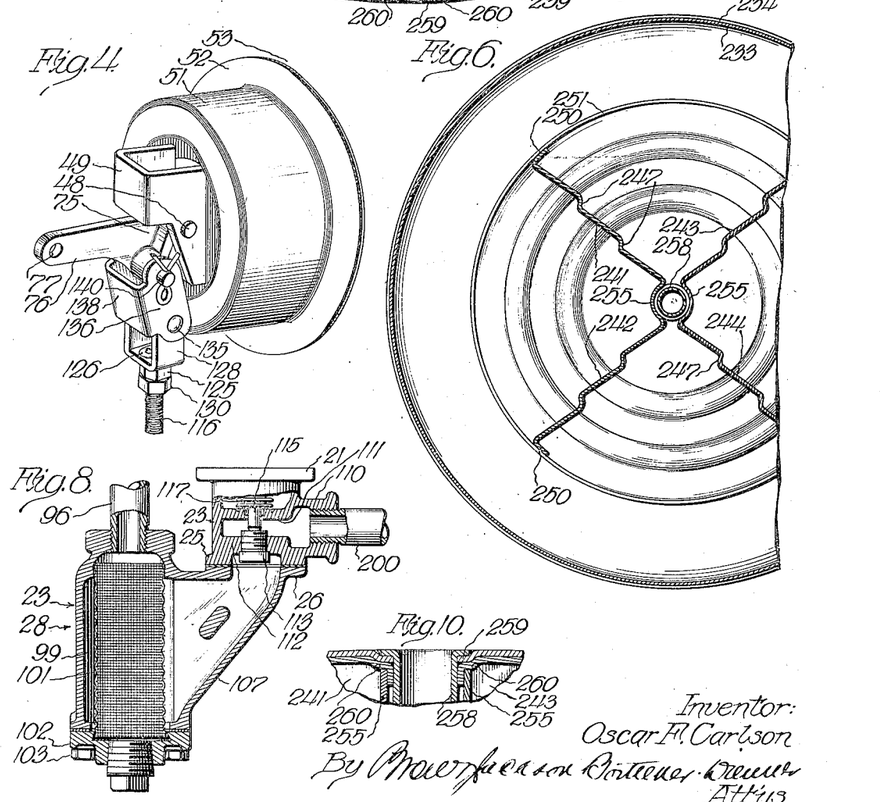
Figure 4 is an enlarged perspective showing a portion of the operating connections between the outer end of the float arm and the stem of the supply or feed water valve.
Figure 6 is a section taken along the line 6—6 of Figure 5.
Figure 8 is a vertical section taken substantially midway through the inlet chamber and the valve housing.
Figure 10 is a fragmentary detail of the float.

An arm 76 is formed on or secured to the outermost end of the float arm 47 and is provided with an aperture 77 or the equivalent, as best shown in Figure 4, by which an instrument or device of any desired character may be connected to be controlled by or responsive to the liquid level in the float housing 10. For this purpose the intermediate housing 11 is made substantially cylindrical in formation and is provided with an open end 80 opposite the end of the intermediate housing 11 which is connected with the float housing 10 adjacent the partition plate 51. A closure plate 81 is secured over the opening 80 and adjacent the operating arm 76 by means of screws or the like 84 which are disposed in suitable openings formed in the peripheral flange 85 of the closure plate and threaded into bosses 86 or the like formed on the housing 11. Preferably, the bosses 86 are disposed away from or outwardly of the general plane of the opening 80 so that when in place the closure 81 is spaced a small distance from the open end 80 so as to allow air to circulate into and out of the intermediate housing 11. To facilitate the circulation of air the housing 11 is provided with openings 88 formed in the walls thereof between the spaced lugs 17 and 18, see Figure 1. The casing mentioned above provides slotted vents for the escape of air entering the intermediate housing through the inlet openings 88. By removing the closure plate 81 various types of instruments or devices may be attached to or mounted adjacent the intermediate housing 11 and connected with the operating arm 76 of the float arm 47. The present invention is not primarily concerned with any particular type of instrument or device and hence the same has not been illustrated. It is to be understood, however, that such devices as electrical control switches may be connected with the arm 76 to be actuated when the float 40 is disposed in a given or predetermined position so as to sound an alarm or operate a control or any other means desired. In case such devices are to be connected with the steam or water space of the float housing, as would be necessary if such devices include pressure or temperature responsive means, the float housing is provided with a plurality of tapped openings 90.

The valve housing 23 contains the valve which controls the supply of feed water going to the boiler, and connected with the valve housing and depending therefrom is the inlet or strainer housing 28 to the upper end of which the supply pipe 96 is connected, as best shown in Figures 1 and 8. The vertical portion of the strainer housing 28 includes an inlet chamber 99 in which is disposed a screen 101 fitting between an interior flange or shoulder near the upper end of the housing 28 and secured to a closure 102 secured, as by cap screws 103 to the lower end of the strainer housing. The strainer housing 28 is formed with a lateral branch 107 communicating with the inlet chamber 99 and leading upwardly therefrom into the valve housing 23. The inlet or strainer housing is supported from the valve housing 23 by virtue of the flanges 26 formed at the upper end of the flange 107 as explained above.

The valve housing 23 contains the control valve governing the supply of feed water for the boiler. The housing 23 is provided with a lateral branch 110 and a pair of spaced walls 111 and 112. The latter wall is provided with an opening suitably threaded to receive a valve plug 113 which acts as a valve seat cooperating with the feed water control valve 115 in governing the admission of water from the interior of the branch 107 to the space between the walls 111 and 112. The valve closure 115 is provided with a vertically extending stem 116 passing upwardly through an opening formed in the upper wall 111. A flexible diaphragm 117 is utilized to seal the space above the wall from the space between the walls 111 and 112 of the valve housing. The flexible diaphragm is suitably secured at its upper portion with the valve stem 116, which is movable vertically, and the lower edges of the sealing diaphragm or bellows is suitably secured to the wall 111. Preferably the valve proper 115 extends upwardly to a point where the flexible diaphragm or bellows 117 is secured to the stem 116. The bellows is preferably secured to the wall 111 and the stem 116 by soldering or the like. The use of such a sealing means in this connection provides a construction serving as a packing for the movable valve stem without the friction and the danger of leakage incident to the use of ordinary packing glands.

The valve stem 116 also extends upwardly through a plate 120 seated in a suitable groove adjacent the upper flange 21 of the valve housing as shown in Figures 2 and 8. The plate 120 is provided with an opening to receive the valve stem and to guide the same in its vertical movements. The uppermost end of the valve stem 116 extends into the lower portion of the intermediate housing 11 and is suitably connected with the outer end of the float arm 47 to be actuated in accordance with the movements of the float 40. As best shown in Figures 2 and 4, the means operatively connecting the float arm 47 with the vertically movable valve stem 116 includes a pair of members acting as a toggle. The upper end of the valve stem 116 is threaded and receives nut member 125 having a central sleeve portion 126 adapted to be received within a suitable opening formed in the central portion of a connecting yoke 128. After the yoke 128 has been positioned over the sleeve 126 the latter is pressed outwardly over the edges of the opening in the yoke to fasten the nut member 125 to the yoke 128. Preferably, however, the nut member 125 is rotatable with respect to the yoke 128 to permit rotating the former to adjust the vertical position of the valve. A suitable lock nut 130 is also threaded onto the upper end of the stem 116 to securely maintain the nut 125 in adjusted position.

The upper ends of the arms of the yoke 128 are suitably apertured to receive a pin 135 which serves to pivotally connect a U-shaped connecting link 136 therewith. The U-shaped connecting link comprises a pair of side members provided with apertures at the upper and lower portions thereof and connected together by means of an intermediate connecting web 138. The lower apertures of the connecting member 136 receive the pivot pin 135 and the upper apertures are adapted to receive a second pivot pin 140 by means of which the connecting link 136 is pivotally connected with the angularly disposed end 75 of the float arm 47. The pin 140 is held in position preferably by cotter keys or the equivalent.

The connecting link 136 and the angularly disposed arm 75 comprise a toggle operative to shift the valve 115 vertically in response to movements of the float 40. From Figure 2 it will be observed that the pivot 48 about which the float arm swings is disposed slightly out of line with the vertical axis of the valve stem 116 extended. By virtue of this construction the connecting link 136 makes an angle of about 18 or 19 degrees with respect to the vertical and, as mentioned above, the angularly disposed arm 75 makes an angle of approximately 30 degrees. This construction makes it possible to dispose the pivot axis 48 of the float arm closely adjacent the supporting partition plate 51. Means is provided to guide the upper end of the yoke 128 and the lower end of the connecting link 136. Preferably this means comprises a roller 150 or the like journaled for rotation on the pin 135, as best shown in Figure 2. The roller 150 is in contact with and reacts against the laterally outer face of the partition plate 51 during the upward movement of the float, which is the movement utilized in effecting the closing of the valve 115. As will be clear from Figure 2, when the float 40 is raised due to the rising water level in the float chamber 41 the arm 75 swings in a counterclockwise direction which, acting through the connecting link 136, exerts a downwardly and inwardly acting force on the upper end of the yoke 28. The inward component is taken care of by the roller 150 reacting against the outer face of the partition plate 51, while the downward component is operative to close the valve 115 against its seat 113. Thus, the swinging movement of the arm occasions a substantially vertical downward movement of the yoke 128 and the valve stem 116.

Normally, the linkage and toggle connections just described are arranged so that when the float 40 is in the position indicated in Figure 2 the valve 115 is closed against its valve seat 113. In this position, as will be apparent, the toggle members, which consist of the angularly disposed arm 75 and the connecting link 136, are not in a straight line position but are disposed at substantially 30 degrees and 18 degrees, respectively, relative to the vertical. By having the valve closed with the toggle members in this position the valve 116 will be closed tightly by the float regardless of any wear on either the valve proper 115 or the valve seat 113 or other small variations in the distance between the valve seat 113 and the axis of the float arm. Should wear occur on these parts, by virtue of the angular disposition of the toggle members, the only thing which can occur is that the toggle will be straightened out a slight amount over and above that shown in Figure 2 in order to take care of the additional displacement of the valve made necessary by the wear mentioned. Thus, a construction is realized in which the valve will be closed tightly under practically all operating conditions throughout the life of the device. The angular disposition of the toggle members mentioned above is such that the members are sufficiently near their straight line position to provide ample power for closing the valve while yet providing sufficient angularity to take care of manufacturing variations and ordinary wear of the valve and the valve stem so that frequent adjustments are entirely obviated by the present construction.

The float in all cases is arranged to close the valve when the level of water in the boiler is a short fixed distance above the bottom opening provided in the boiler for gauge glass connection.

The arrangement of the water feeder so that the same may be installed at the points of connection where the usual gauge glass is mounted and regardless of the spacing of the gauge glass openings the float valve is arranged invariably to cut off at a level which is a short distance above the bottom gauge glass opening form one of the principal features of the present invention, as mentioned above. To this end the float housing 10 is provided with suitable connections adapting the device for gauge glass fittings of various spacings, as may be encountered in various types of boilers or the like. The present invention also contemplates such connections as will permit the optional disposition of the water feeder in a plurality of angular or lateral positions so as to bring the supply and feed connections and other parts of the apparatus to just the exact position desired or required by the particular boiler installation. Referring now more particularly to Figures 1 and 3, the latter figure showing the preferred method of installing the water feeder, and remembering that the float housing 10 is formed of two housing parts, an upper part 30 and the lower part 31, it will be observed that the lower housing part 31 is formed with three bosses 160, 161, and 162. These bosses are provided with suitable threaded openings communicating with the float chamber 41 and the axes of these openings are disposed in the same plane, the bosses 160 and 162 being arranged in axial alignment but extending in opposite directions while the boss 161 is disposed at substantially a right angle to the aligned bosses 160 and 162. Preferably, the threaded openings in these bosses are all of the same size to permit an interchange of fittings for purposes which will appear later. A nipple 165 is provided and is adapted to be threaded into any one of the openings in the bosses 160, 161, and 162, and the same is true of the closure plug 166. As illustrated in Figures 1 and 3, however, the nipple 165 is illustrated as being threaded into the boss 161 while the plug 166 is illustrated as disposed in the opening in the boss 160. The lower gauge glass fittings are adapted to be disposed in the third boss 162.

The connections between the float housing 10 and which are adapted to be disposed in the upper gauge glass tapping on the boiler include relatively adjustable parts adapting the water feeder, as mentioned above, for various spacings of the upper and lower gauge glass tappings. In the preferred construction, these adjustable connections comprise an elongated sleeve member 170 secured to the upper housing part 30 and a U-shaped conduit 171 having one leg telescopically associated with the sleeve member 170. The other leg of the U-shaped conduit receives a three-way fitting 172 having threaded ends 174 and 175, see Figure 2, corresponding in spacing and size with the bosses 160 and 162. The third outlet from the fitting 172 is indicated at 176 and includes a union 177 having an exteriorly threaded part adapted to be threaded into the upper boiler gauge glass tapping. A plug 176 is provided for closing either end of the fitting 172.

The telescopic connection between the U-shaped conduit and the sleeve member 170 is best shown in Figure 2. The sleeve member 170 includes a lower flange 180 connected by cap screws 181 to the upper part of the housing 10, the upper housing part 30 having a boss 182 for this purpose. The upper end of the sleeve member 170 is threaded to receive a bushing 183 which receives one leg of the U-shaped conduit 171 and which is provided with suitable packing which when the bushing 183 is tightened in the sleeve member 170 effectively secures the conduit or pipe 171 in fixed position. As indicated in Figure 2, the conduit 171 is capable of being extended for a considerable distance down into the sleeve member 170, which construction provides a considerable range of vertical adjustment of the upper fitting 172 relative to the lower nipple 165. This U-shaped conduit or gooseneck lies in the plane of the two connecting nipples 165 and 177. It provides sufficient flexibility in that plane to make up for unavoidable variations in the drawing up of the said nipples 165 and 177 in the threaded seats 192 and 193.

Figure 9:
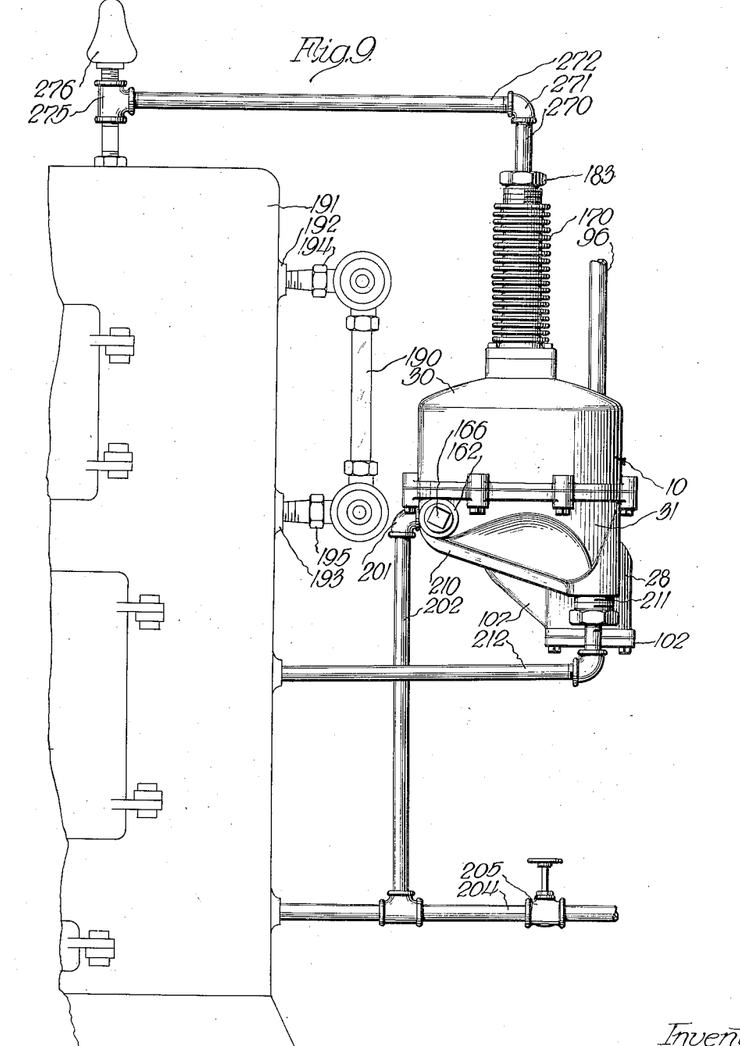
Figure 9 is a view similar to Figure 4 and illustrating a slightly different form of installation of the water feeder in which the gauge glass connections are not utilized or disturbed but with the feeder arranged to cut off inflow of feed water at a level only a short distance above the bottom of the gauge glass.

The gauge glass is indicated by the reference numeral 190. Usually this gauge glass is secured directly to the boiler 191 at upper and lower gauge glass tappings 192 and 193 by gauge glass fittings 194 and 195 or the like, as best shown in Figures 3 and 9. Figure 9 illustrates the gauge glass in its usual or conventional position on the boiler, the boiler feeder and controller being separately connected with the boiler. In Figure 3, however, the preferred installation is illustrated, and in this case in installing the water feeder and controller the gauge glass 190 is removed and the nipple 165 threaded into the lower gauge glass tapping 193 on the boiler while the coupling 177 is threaded into the upper gauge glass tapping 192, the bushing 183 being loosened during the process of installation to permit the conduit 171 to shift into or out of the sleeve member 170 at the top of the float housing to accommodate the particular spacing between the gauge glass tappings 192 and 193. After the connections 165 and 177 are tightened the bushing 183 is then tightened to make a firm and leak-tight joint between the conduit 171 and the sleeve member 170. The gauge glass 190 which was removed from the boiler to permit the assembly of the water feeder and controller is then mounted, see Figure 1, at either side of the connections between the water feeder and the boiler. In Figure 1 the gauge glass 190 is shown as connected with the boss 162 and the end 175 of the upper fitting 172. Obviously, of course, the gauge glass 190 could be mounted on the other side at 160 and 174, if desired. It is also possible to connect the water feeder and regulator with the boiler at the points 160 and 174 or 162 and 175, in which case the gauge glass 190 could, if desired, be connected with the nipple 165 and the union 177 by the provision of suitable connections. It is also to be understood that the present invention contemplates the provision of means for connecting the water feeder to the boiler by fittings or the like which may be connected in the connections between the boiler and gauge glass, rather than by replacing such connections.

By virtue of the telescopic connection between the sleeve member 170 and the conduit 171 and the arrangement of the float housing 10 in two separable parts 30 and 31 it is also possible to dispose the intermediate housing 11, which carries the valve housing 23 and the inlet housing 28, in various positions by merely disconnecting the series of cap screws 35 and shifting the upper housing part 30 relative to the lower housing part 31. Since the conduit 171 is capable of rotation in the sleeve member 170 and since, as just mentioned, all of the operating parts are carried by the upper housing part, the supply and feed lines of the water heater and controller may be disposed in a number of selected positions with respect to the connections to the boiler and the connections accommodating the gauge glass.

The preferred arrangement of the supply and feed lines is indicated in Figure 3. The supply of feed water entering through the supply connection 96 enters the inlet housing 28 and passes through the valve housing 23 into the lateral branch 110 and the conduit 200 which leads to the boiler. At the end opposite the branch 110 the conduit 200 is provided with an elbow 201 with which is connected a vertical pipe section 202. The lower end of the pipe 202 is connected to a T 203 disposed in the line 204 leading to the boiler. The conduit 204, which includes a valve 205, may connect with the radiator return line or a water main or any other suitable source of supply, as is usual in boilers and the like.

The lower housing part 31 is formed with a slanting bottom, indicated by the reference numeral 210, which leads to a fitting 211 connected with the boiler by a return line 212. The lower part of the float housing is therefore placed in communication with the water space of the boiler by two separate means, namely, the nipple 165 and the connection 212, while the upper portion of the float housing is connected with the steam space of the boiler by connecting means which includes the conduit 171 and the coupling 177.

In the form of my device illustrated in Figs. 1, 2 and 3, the bottom nipple which is connected to the lower gauge glass opening in the boiler is fixed with reference to the flotation position of float 43 when it shuts off the valve 115 so that the level of water in the boiler stands a short definite distance above the bottom of the gauge glass well below the middle of the gauge glass for any commercial length of gauge glass. That is to say by way of example, no matter whether the gauge glass is a seven inch or twelve inch glass the float valve cuts off at a definite distance above the bottom of the gauge glass, for example one inch. Hence in installing the device the benefit of having room in the boiler for the condensate to flow back is automatically provided without any thought, attention, or effort on the part of the man installing the device.

The operation of the water feeder and controller described above is believed to be apparent from the above description. The position of the float 40 within the float housing 10 is controlled by the water level in the boiler, the float housing being subjected to the steam and water pressures existing within the boiler, and the provision of a water feeder and controller which is adapted to be mounted at the gauge glass fittings of the boiler ensures an installation wherein the disposition of the liquid level responsive float is at a desired vertical position relative to the water level in the boiler without any particular attention on the part of the workmen to that end. When the water level in the boiler falls the position of the float 40 also falls and, as will be apparent from Figure 2, this will raise the valve 115 off its seat 113, whereupon feed water will be led from the supply connection 96 through the inlet chamber 99 and the branch 107 past the valve 115 and into the connection 200. From here the feed water is directed through the part 202 into the inlet connection 204 associated with the boiler and opening into the lower portion of the water level thereof. When the level in the boiler has been raised to the desired point the float rises, and in so doing will close the valve 115, thus shutting off the addition of any further feed water to the boiler. The water feeder and regulator being connected with the steam and water space of the boiler by relatively short connections provides a positive and sensitive control in which the water level in the float housing is, for all practical purposes, the same as the water level in the boiler itself.

The valve 115 and the valve seat 113, and, as a matter of fact, the entire valve housing and associated parts are subjected to the temperature of the feed water while the float 40 and the float housing and associated parts are subjected to the temperature of the water and steam in the boiler. The feed water is normally quite cool compared to the water and steam existing in the float housing, and one of the features of the present invention is the disposition of means between the vertically disposed valve housing and the float housing for preventing the excessive transmission of heat from the float housing and associated parts to the valve housing and its associated parts. Since the feed water is relatively cool it is especially desirable to prevent the valve 115 and valve seat 113 from becoming heated. It must be remembered that during considerable periods of time no feed water is supplied to the boiler, and if during such time the valve and valve seat were permitted to become heated when the water level in the boiler fell to a point which initiated the opening of the valve and the consequent flow of feed water to the boiler the flow of the feed water past the valve and valve seat would then cool the same down to the temperature of the feed water. This heating and cooling of the valve and valve seat and the consequent expansion and contraction thereof is objectionable because of the tendency for these parts to deteriorate, in which case it would be no longer possible to maintain an absolutely liquid-tight seal when the control valve should be closed.

To prevent heating of the valve and associated parts the present invention provides a construction in which the intermediate housing 11 is open to the atmosphere and is arranged to permit the free circulation of air around the operating connections between the float arm and the valve, these connections tending at all times to transmit heat from the float housing to the valve. The present invention also contemplates interposing heat insulating means between the intermediate housing 11 and the valve housing 23. As indicated in Figures 1 and 2, said heat insulating means take the form of flat strips and washers or the like, indicated by the reference numerals 220 and 221. These serve to prevent the transmission of heat from the float housing through the intermediate housing to the valve housing, and the circulation of air around the toggle members and the other connections serves to prevent the transmission of heat from the float to the valve through these connections. Since the valve stem 116 is effectively sealed to the wall 111 of the valve housing and the float arm 47 is effectively sealed to the supporting partition plate 51, there is no danger of any leakage of either hot or cold water into the intermediate housing. This is an important feature particularly where electrical control or alarm devices are mounted upon or associated with the intermediate housing to be actuated by the arm 76 on the float arm.

Another feature of the present invention which is of considerable importance is the provision of cooling fins 225 formed on or secured to the sleeve member 170. It will be remembered that the conduit comprising the U-shaped member 171 and the sleeve member 170 normally contain steam. This steam is cooled to a temperature considerably lower than the temperature of the steam in the boiler and the plurality of fins 225 in intimate and thermal contact with the air serve to condense a material quantity of the steam into water. The condensate drips down onto the float 40 below, see Figure 2, and thereby washes the latter and prevents the deposit of mud, silt and other precipitates on the float. As will be explained later, the float is preferably formed so as to be almost constantly immersed at the same point, regardless as to whether the float is holding the valve 115 closed or whether it is raising the valve off its seat, and where an object is constantly immersed in a liquid to the same point there sometimes occurs a tendency for solids such as dirt and the like to settle out and become attached to the float. The constant dripping of the water of condensation from the cooling portion of the steam connection 170 serves to prevent the deposit of such precipitates and other materials onto the float.

Referring again to Figure 3, the arrangement including the two connections 165 and 212 between the lower portion of the float housing and the water space of the boiler 191 provides a construction in which, in the first place, turbulence and rising columns of hot water cannot cause any material fluctuations in the level of the water in the float housing. In the second place, these two connections serve to establish a relatively small although definite auxiliary flow of water out through the nipple 165 down the inclined bottom wall 210 of the float housing and back through the connection 212. This construction, particularly because of the provision of the inclined bottom wall of the float housing and the connection 211 therewith at the lowest portion thereof, provides an arrangement wherein there is little likelihood of mud, silt and the like settling in the bottom part of the float housing. In such constructions of which I am aware it has sometimes occurred that enough mud, silt or the like has accumulated in the bottom part of the float housing to allow the float to contact therewith and to become bound thereby. Where the float sticks at the bottom of the float housing the control valve is, of course, held open, and this may occasion a flooding of the boiler by the continued application of feed water thereto even after the level of water in the boiler has exceeded the desired level. This condition is particularly apt to occur where feed water controllers and the like are attached at points such as the gauge glass tappings and which include portions of the float housing extending down below the lower connection with the boiler. Blow-offs and the like may be provided, but such devices are apt to be neglected, whereas a feed water controller constructed according to the principles of the present invention as outlined above is capable of operating over long periods of time without any danger of the accumulation of sufficient boiler mud to cause the float to stick.

In this connection the present invention also contemplates a further improvement in water feeder and controllers in the nature of a particular type of float to be used in connection with such devices where the vertical spacing of the connections to the boiler is limited, as it is where the feeders are to be connected at the gauge glass tappings of the boiler. In the first place, where liquid level control means is to be operatively disposed so as to be movable between close limits the advantages of a float which is arranged for constant immersion is especially desirable. By constant immersion is meant a float in which sufficient operating power is derived from relatively small changes in the depth of flotation of the buoyant body. In the second place, where a float is to be operative between small limits and yet has sufficient buoyancy to provide ample power for the operating functions, a float having a relatively large diameter and a relatively small height is quite advantageous. Also, a float having these relative dimensions readily lends itself to a construction in which the depth of flotation throughout the operative range of the device does not change to any material extent. The present invention contemplates the construction of a float having these desirable features.

Figure 5:
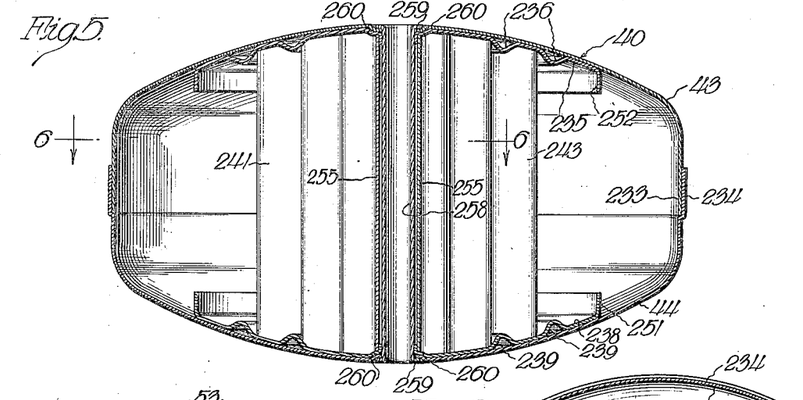
Figure 5 is a vertical cross sectional view taken through the liquid level responsive float and showing in particular the reenforced construction of the float.

The float 40, constructed according to the principles of the present invention and as best illustrated in Figures 2, 5 and 6, comprises relatively shallow upper and lower halves or sections 43 and 44, as mentioned above. These parts are preferably provided with cooperating marginal flanges 233 and 234 which are soldered or otherwise secured together in a manner to form a liquid-tight joint or seam. The upper and lower float parts 43 and 44 present substantially flat upper and lower walls having a considerable area and relatively narrow or shallow marginal walls. In order to reenforce the shell of the float and to strengthen the same against the pressures existing within the float housing, which are substantially the same as the pressures within the boiler 191, the present invention contemplates an assembly of reenforcing washers or plates and ribs or webs of novel construction. Associated with the upper float parts 43 is a washer 235 presenting a curvature corresponding to the relatively flat curvature of the upper wall of the float and provided with reenforcing corrugations 236. The central portion of the washer 235 is apertured and is depressed adjacent the edges thereof for a purpose which will appear later. The lower wall of the float is provided with a similar reenforcing washer or plate 238 provided with corrugations 239 and a central aperture. In the commercial form of the present invention these reenforcing washers or plates are identical in construction and formation. To prevent the pressures within the float housing from collapsing the float, even with the presence of the reenforcing plates 235 and 238, the float is provided with vertical reenforcing ribs or webs arranged in interconnected pairs 241 and 242, and 243 and 244. These reenforcing ribs are also corrugated, as indicated at 247, the general plane of these reenforcing ribs being disposed radially with respect to the vertical geometrical axis of the float, and the radial outermost edges of the ribs are bent at right angles, as at 250, to provide the desired column strength for these parts. Each of the reenforcing plates 235 and 238 are provided with vertically disposed flanges 251 and 252 against which the angularly disposed edges 250 bear when these parts are assembled.

The ribs of each pair are interconnected together by a substantially arcuate section 255 which is concentric with respect to the geometrical axis of the float, as best shown in Figure 6. A pipe or tubular member 258 is mounted in the central apertures of the upper and lower walls of the float and of the reenforcing plates 235 and 238. This tubular member is disposed in between the concentric arcuate sections 255 and the upper and lower ends of the tubular member 258 are turned down against the edges of the upper and lower walls of the float and serve to press the same against the reenforcing plates 235 and 238 and to press the latter against the upper and lower edges of the reenforcing ribs. As will be clear from Figures 5 and 10, the edges of the central openings of the reenforcing plates are depressed or drawn into a short cylinder, as indicated at 259, and are disposed concentrically within the arcuate sections 255 of the vertically disposed reenforcing ribs. The arcuate portions of the reenforcing ribs are notched as at 260, to accommodate this construction. After the tubular member 258 has been inserted and fixed into position the ends thereof are securely sealed, as by soldering or the like, to the upper and lower walls of the float, thereby forming a pneumatically sealed buoyant body. The tubular member provides a convenient and simple construction for receiving the long bolt 67 by which with a single member the float 40 may be secured to its float arm.

Because of the relatively large diameter of the float 40 relatively small changes in the depth of flotation occasion a considerable difference in the displacement, and hence the float remains substantially at the same depth of immersion, regardless as to whether the control valve is held open or closed.

In Figure 9 I have illustrated an installation which is somewhat similar to that shown in Figure 3 but which does not utilize the gauge glass tappings in connecting the water feeder and controller with the boiler. In Figure 9 the U-shaped conduit 171 shown in Figure 3 is dispensed with and a straight pipe 270 is used in its place. The upper end of the pipe 270 is connected by an elbow 271 with a horizontal pipe section 272 which leads to a T 275 connected in the line between the boiler 191 and the safety valve 276. Otherwise, the feed water regulator is connected with the boiler in substantially the same manner as has been described above and as illustrated in Figure 3. In the case of the installation shown in Figure 9, however, it will be observed that the gauge glass 190 has not been disturbed and it is not necessary to remove this part from the boiler. The pipes 270 and 272 are the means by which the float housing 10 communicates with the steam space of the boiler and the connection 212 with the lower part 31 of the float housing serves to connect the latter with the water space. In an installation of this sort it is necessary to provide two plugs 166 to close the openings in the bosses 160 and 162 in the lower housing part 31. This installation is somewhat simpler than that shown in Figure 3 and the disposition of the bosses 160 and 162 in the same horizontal plane as the lower gauge glass fitting on the boiler provides an arrangement wherein the float housing may be readily and conveniently installed in exactly the proper position to bring the water level to the desired point therein. In this way, some of the advantages present in the installation shown in Figure 3 are also realized in the installation shown in Figure 9.

While I have shown and described above the preferred construction in which the present invention is embodied, it will be apparent to those skilled in the art that my invention is not to be limited to the specific details shown and described, but that, in fact, widely different means may be employed in the practice of the broader aspects of my invention.

What I claim, therefore, and desire to secure by Letters Patent is:

1. A liquid level control mechanism for boilers, said control mechanism comprising a float chamber having upper and lower connections, a float disposed in said housing, a float arm pivotally supported on said float housing and connected with said float at its inner end, the other end of said float arm including a portion disposed angularly with respect to the main body of the arm, an intermediate housing secured to the float housing and enclosing said end of the float arm, a valve housing supported from the float housing and including a valve having a movable stem, means connecting said stem with said angularly disposed end of the float arm, said last named end and said connecting means forming a toggle, and an operating arm carried by said float arm and disposed in said intermediate housing, the latter having a portion disposed adjacent the operating arm and adapted to receive instrumentalities to be actuated by the operating arm.

2. A liquid level control mechanism comprising a float chamber, a float disposed therein, a float arm movably supported in said float chamber and connected with said float, one end of said float arm extending exteriorly of the float chamber and having a portion extending at an angle to the float arm, an intermediate housing open to the atmosphere secured to the float housing and enclosing said outer end of the float arm, air inlet openings in the lower part of said intermediate housing, a valve housing disposed adjacent the intermediate housing on the underside thereof and adjacent said openings, valve mechanism carried by the valve housing, connections between said valve mechanism and said outer end of the float arm, and a removable cover plate secured to said intermediate housing and affording access to said connections without disturbing them.

3. A liquid level control mechanism comprising a float chamber, a float therein responsive to the liquid level in the float chamber, a float arm connected with the float and extending from the float chamber, an intermediate housing secured to the float housing and having a lower portion open to the atmosphere, a vertically disposed valve housing rigidly supported from the float chamber below the intermediate housing, a supply valve operatively mounted in the valve housing, connecting means between the supply valve and the float arm, and means disposed adjacent the open lower portion of said intermediate housing for guiding said connecting means.

4. A liquid level control mechanism comprising a float chamber, a float disposed therein, a float arm movably supported in said float chamber and connected with said float, one end of said float arm extending exteriorly of the float chamber, an intermediate housing secured to the float housing and enclosing said outer end of the float arm, an air inlet opening in the lower part of said intermediate housing, a valve housing supported from the float chamber and disposed on the underside of said intermediate housing adjacent said opening, valve mechanism carried by the valve housing, and connections disposed in said opening and extending between said valve mechanism and said outer end of the float arm.

5. A liquid level control mechanism comprising a float chamber, a float disposed therein, a float arm movably supported in said float chamber and connected with said float, one end of said float arm extending exteriorly of the float chamber, an intermediate housing secured to the float housing and enclosing said outer end of the float arm, an air inlet opening in the lower part of said intermediate housing, a valve housing supported from the float chamber and disposed on the underside of said intermediate housing adjacent said opening, valve mechanism carried by the valve housing, connections disposed in said opening and extending between said valve mechanism and said outer end of the float arm, and means providing for the escape of air entering the intermediate housing through said air inlet opening.

6. A liquid level control mechanism comprising a float chamber, a float disposed therein, a float arm movably supported in said float chamber and connected with said float, one end of said float arm extending exteriorly of the float chamber and having a portion extending at an angle to the float arm, an intermediate housing secured to the float housing and enclosing said outer end of the float arm, an air inlet opening in the lower part of said intermediate housing, a valve housing supported from the float chamber and disposed on the underside of said intermediate housing adjacent said opening, valve mechanism carried by the valve housing, connections disposed in said opening and extending between said valve mechanism and said outer end of the float arm, and means providing at least one slotted vent above said lower opening for the escape of air entering the intermediate housing through said air inlet opening.

7. In a device of the class described, a float housing having steam and water connections to a boiler, a float in the housing, a bell crank lever having a relatively long substantially horizontal float arm projecting through an opening in the housing, a pivotal support for said lever upon the outside of the housing, a laterally flexible metallic bellows sealing said arm to said opening, said lever having a relatively short arm extending downwardly from said pivot and forming a toggle arm, a valve housing having an inlet for feed water adapted to be connected to a source of feed water under pressure, and an outlet adapted to lead to the boiler, a metal valve seat in said valve housing having a relatively small port, a metallic lift valve cooperating with said seat and closing against inlet pressure of the feed water supply, said valve having a substantially vertical stem, a longitudinally flexible metallic bellows sealing said stem to said valve housing, a toggle link between said toggle arm and said valve stem, and rigid means providing an angular frame connection between the float housing and the valve housing, said float as it approaches high level position substantially straightening said toggle to force the valve against its seat to shut off incoming feed water.

8. A boiler feeder for attachment to the usual but variously spaced gauge glass opening of a steam boiler comprising a rigid float housing having an opening, a float therein, a lever pivoted outside the housing and having a long arm extending through said opening and connected to the float and a short arm, a feed valve comprising a housing, a metal valve seat and a metal valve having a stem extending outside the valve housing, a metal bellows sealing the long arm to the opening of the float housing and a metal bellows sealing the valve stem to the valve housing, a mechanical connection between the two housings, said valve seating against incoming feed water pressure, toggle mechanism comprising said short arm as an operating means for forcing the valve to seat against pressure when the float rises to a predetermined level in said float housing, said float housing having a short horizontal nipple extending therefrom for connection with the lower gauge glass opening of the boiler, said nipple being at such a level with respect to the float that the valve will invariably be closed off when the water level in the float housing is a relatively short fixed distance above said nipple less than half a gauge glass above said lower nipple for any spacing of said openings, a nipple for connection with the upper gauge glass of the boiler, a telescopic connection between the top of said float housing and said nipple, and a compression packing for said telescopic connection.

9. In a boiler control for connection to variously spaced horizontally extending gauge glass openings of boilers, the combination of a float housing, a float therein, a boiler control device connected to said float, said housing having a bottom connection comprising a pipe extending horizontally from a fixed point on said housing and adapted for direct introduction into the lower horizontal gauge glass opening, said float and control device being mounted with respect to said housing to cause operation of said device when the water level in said housing is at a relatively short predetermined distance above said horizontal pipe, said housing having a top connection comprising a nipple horizontally extending for connection with the top horizontal gauge glass opening of said boiler, and a tube between said second nipple and said housing adjustable vertically as to length to allow connection of said second horizontal nipple to the upper gauge glass opening regardless of its spacing with respect to said lower nipple and without disturbing the fixed relation of the level above the lower nipple at which the float actuates said device, said level at which said device is operated being substantially below half way between the nipples when they are a minimum distance apart.

10. In a boiler control for connection to variously spaced horizontally extending gauge glass openings of boilers, a float housing having a top connection adjustable as to height, and a bottom connection fixed as to height, a float in said housing, boiler control means wholly external to the float housing and sealed off from the interior thereof, but in fixed relation mechanically to the float whereby said control means is actuated at a definite water level in said housing, which level is a fixed but relatively short distance above the fixed bottom connection of the float housing, said fixed bottom connection comprising a horizontally extending nipple for insertion in the bottom gauge glass opening of the boiler, said adjustable top connection comprising a horizontally extending nipple for insertion into the upper gauge glass opening of the boiler, and a tube of adjustable length, vertically between the second nipple and the top of said housing to accommodate various spacings of gauge glass openings, adjustment of the tube to raise or lower the upper horizontally extending nipple for various spacing having no influence upon the fixed distance from the lower nipple to the level at which the float operates said fixed control means, said distance being substantially less than one half of the distance between said nipples when the same are disposed at minimum spacing.

11. A device of the class described for application to boilers having horizontally extending gauge glass openings and being provided at said openings with means for coupling the openings with water gauge glass fittings, such openings in different boilers being spaced vertically by various distances to accommodate standard gauge glasses of various heights, said feeder comprising a pair of horizontally extending fittings having couplings adapted for ready attachment to said means in register with such horizontally extending gauge glass openings, a float housing being fixedly coupled to said lower fitting and having a float which responds to a level of water in the housing a short fixed distance above said lower fitting, a control device for said boiler actuated by response of said float, a vertically adjustable slip fit tubular coupling between said upper fitting and the upper part of said float housing, said adjustable coupling maintaining the upper fitting in horizontal alignment for any vertical position within its adjustment, and a compression packing for sealing said adjustable tubular coupling in its adjusted position.

12. The combination of claim 11, wherein the said fittings are provided with oppositely facing vertically aligned gauge glass couplings one in fixed relation to each fitting respectively, whereby to receive a gauge glass corresponding in height to the spacing of the openings of the boiler to which it is applied.

13. The combination of claim 11 wherein the device is adapted to be coupled to boilers having substantially vertical walls with threaded pipe sockets at the horizontally extending openings and the said feeder fittings comprise nipples adapted to be threaded into said pipe sockets.

14. The combination of claim 11, wherein the said fittings are provided with oppositely facing vertically aligned gauge glass couplings one in fixed relation to each fitting respectively, whereby to receive a gauge glass corresponding in height to the spacing of the openings and shut-off valves between the gauge glass couplings and the fittings to shut off the gauge glass couplings in case of breakage of the gauge glass, without interference with the operation of the float.

OSCAR F. CARLSON.